(12) United States Patent
Brown et al.

(10) Patent No.: US 8,659,427 B2
(45) Date of Patent: Feb. 25, 2014

(54) PROXIMITY-SENSOR SUPPORTING MULTIPLE APPLICATION SERVICES

(75) Inventors: David L. Brown, Jupiter, FL (US); John J. Giobbi, Bend, OR (US)

(73) Assignee: Proxense, LLC, Bend, OR (US)

( * ) Notice: Subject to any disclaimer, the term of this patent is extended or adjusted under 35 U.S.C. 154(b) by 810 days.

(21) Appl. No.: 12/268,397

(22) Filed: Nov. 10, 2008

(65) Prior Publication Data
US 2009/0121890 A1 May 14, 2009

Related U.S. Application Data

(60) Provisional application No. 60/986,939, filed on Nov. 9, 2007, provisional application No. 61/080,916, filed on Jul. 15, 2008.

(51) Int. Cl.
*G08B 13/14* (2006.01)

(52) U.S. Cl.
USPC ........... 340/572.1; 340/1.1; 340/5.1; 340/5.2; 340/539.1; 340/539.11; 340/539.13; 340/10.1; 340/10.3; 340/10.5; 340/10.51; 340/8.1; 340/5.4; 340/5.61; 705/64; 705/65; 705/66; 705/67; 705/68; 705/69

(58) Field of Classification Search
None
See application file for complete search history.

(56) References Cited

U.S. PATENT DOCUMENTS

| | | | | |
|---|---|---|---|---|
| 5,594,227 A | * | 1/1997 | Deo | 235/380 |
| 6,980,087 B2 | * | 12/2005 | Zukowski | 340/10.51 |
| 2005/0035897 A1 | * | 2/2005 | Perl et al. | 342/29 |
| 2005/0200453 A1 | | 9/2005 | Turner et al. | |
| 2005/0242921 A1 | * | 11/2005 | Zimmerman et al. | 340/5.2 |
| 2005/0282558 A1 | * | 12/2005 | Choi et al. | 455/456.1 |
| 2006/0173991 A1 | * | 8/2006 | Piikivi | 709/224 |
| 2007/0159994 A1 | | 7/2007 | Brown et al. | |
| 2007/0218921 A1 | * | 9/2007 | Lee et al. | 455/456.1 |
| 2008/0169909 A1 | * | 7/2008 | Park et al. | 340/10.4 |

OTHER PUBLICATIONS

PCT International Search Report and Written Opinion, PCT Application No. PCT/US08/83060, Dec. 29, 2008, 9 pages.

* cited by examiner

*Primary Examiner* — Benjamin C Lee
*Assistant Examiner* — Curtis King
(74) *Attorney, Agent, or Firm* — Patent Law Works LLP

(57) ABSTRACT

A personal digital key (e.g., which can be carried by a human) contains a memory having different service blocks. Each service block is accessible by a corresponding service block access key. As the personal digital key (PDK) moves around, it is detected by sensors. The sensors report position data, thus enabling location tracking of the PDK. The sensors also provide a data path to various applications. An application that has access to a service block access key can therefore access the corresponding service block on the PDK. The sensors themselves may also contain service block access keys.

27 Claims, 9 Drawing Sheets

PROXIMITY-SENSOR SUPPORTING MULTIPLE APPLICATION SERVICES

CROSS-REFERENCE TO RELATED APPLICATIONS

The present application claims the benefit of priority under 35 U.S.C. §119(e) of (a) U.S. Provisional Application No. 60/986,939 entitled "Location Tracking System and User Interface," filed on Nov. 9, 2007 by Andrew Haras, David L. Brown, John J. Giobbi and Fred S. Hirt; and (b) U.S. Provisional Application No. 61/080,916 entitled "TruProx White Paper," filed on Jul. 15, 2008 by John J. Giobbi. The entire contents of all of the foregoing are incorporated by reference herein.

BACKGROUND

1. Field of Art

The invention generally relates to personal digital keys and corresponding sensors, capable of proximity detection/location determination and auxiliary data services/application services.

2. Description of the Related Art

Proximity sensors and location tracking are technologies with many applications. For example, proximity sensors can be used to provide secure access to physical and/or digital assets, based on biometrics, passwords, PINs, or other types of authentication. Proximity sensors typically have advantages of being less cumbersome, easier to use, and more flexible in form factor and implementation. Proximity sensors can be used to control access to resources and/or to authenticate individuals, for example.

One possible application that can take advantage of proximity sensors is location tracking. RFID tracking is one example. In RFID, RFID tags are attached to objects to be tracked. RFID readers then interact with the RFID tags to determine the location of the tag. Regardless of how it is accomplished, location tracking (i.e., knowledge about the location of an object or person) is generally useful. For example, location tracking information can be used to track inventory and trace the route of objects through various locations. It can be used for time and motion studies. If tags are attached to people, then tracking of people can be used to better understand their behavior. Knowledge about a person's location (and/or their past locations and projected future locations) could be used to provide better services to that person.

However, most proximity systems and location tracking systems have limited capabilities. Typically, the proximity sensor, RFID tag or similar device is a dumb device, in the sense that the device is designed and has the capability only to report its location. For example, such devices typically do not have the capabilities to run different applications or to even interact with different applications. Furthermore, these systems typically are proprietary and narrowly tailored for a specific situation, thus preventing easy expandability to other situations or third party applications.

SUMMARY

Various drawbacks of the prior art are overcome by providing a personal digital key (e.g., which can be carried by a human) that contains a memory having different service blocks. Each service block accessible by a corresponding service block access key. As the personal digital key (PDK) moves around, it is detected by sensors. Each sensor covers an area that will be referred to as a microcell. The microcells are sized based on proximity. For example, if a sensor is used to detect proximity to a specific object, the sensor may be located on or around the object and its microcell adjusted to a size that indicates proximity to the object of interest. The specific size of microcells may vary depending on the object, environment, and specific application. However, microcells typically will be relatively small. For example, diameters in the 1-10 meter range would not be unusual. The sensors report position data (e.g., that the PDK is in the proximity of or within the microcell of a specific sensor), thus enabling location tracking of the PDK. The sensors also provide a data path to various applications. An application that has access to a service block access key can therefore access the corresponding service block on the PDK. The sensors themselves may also contain service block access keys.

In one implementation, a sensor management module (SMM) manages the network of sensors. The sensors are positioned at known locations. Each sensor covers a microcell and communicates wirelessly with PDKs in its microcell, gathering position data about these PDKs. The sensors transmit the position data to the SMM, which generates location tracking data for the PDK based on the position data. The SMM is configured to facilitate communication with one or more applications, and can make the location tracking data available to the applications. In addition, the SMM and the sensor provide a data path between a service block on the PDK and an application that has access to the corresponding service block access key.

As a result, application(s) can interact directly with the PDK. For example, the service blocks on the PDK may contain biometric or other information used for authentication or verification. Alternately, the service blocks may be used as secure local memory for the application. There can be various mappings between the service blocks and the applications; one-to-one mapping is not required. Preferably, different applications can have access to different service block access keys and the sensor and SMM provide a data path between each application and the corresponding service block(s) on the PDK, thus facilitating the use of multiple applications with one PDK.

The sensor itself can also contain a service block access key in order to access the corresponding service block on the PDK. In another aspect, the sensor can also include a biometric input. Other types of security inputs can also be used, for example passwords or PINs.

In one useful scenario, the sensors are located inside a structure and the SMM tracks the location of the PDK within the structure, due to the PDK's proximity to the various sensors. For example, the sensors may be located inside a building, the PDK is sized to be carried by a human, and the SMM tracks the location of the PDK within the building as a proxy for the location of the human. A similar task can be accomplished for outdoor or mixed (indoor/outdoor) sites. For example, guests at an amusement park may be issued PDKs as they enter, with sensors located to indicate proximity to various points of interest. The guests can then be located and/or tracked as they move from one point of interest to the next.

In one architecture, the SMM communicates with applications via an application layer message bus. In another aspect, the system also includes a coordinator module communicatively coupled to the SMM. The coordinator module broadcasts a beacon to the sensors and PDKs. The sensors and PDKs synchronize to the beacon.

In another alternative, a sensor is communicatively coupled to an application. The sensor is capable of communicating wirelessly with a personal digital key (PDK) when the PDK is in range of the sensor. The PDK contains a memory having service blocks. Each service block is accessible by a corresponding service block access key. The sensor provides a data path between a service block on the PDK and an application that has access to the corresponding service block access key.

Other aspects of the invention include systems and components corresponding to the above, and methods corresponding to all of the foregoing.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
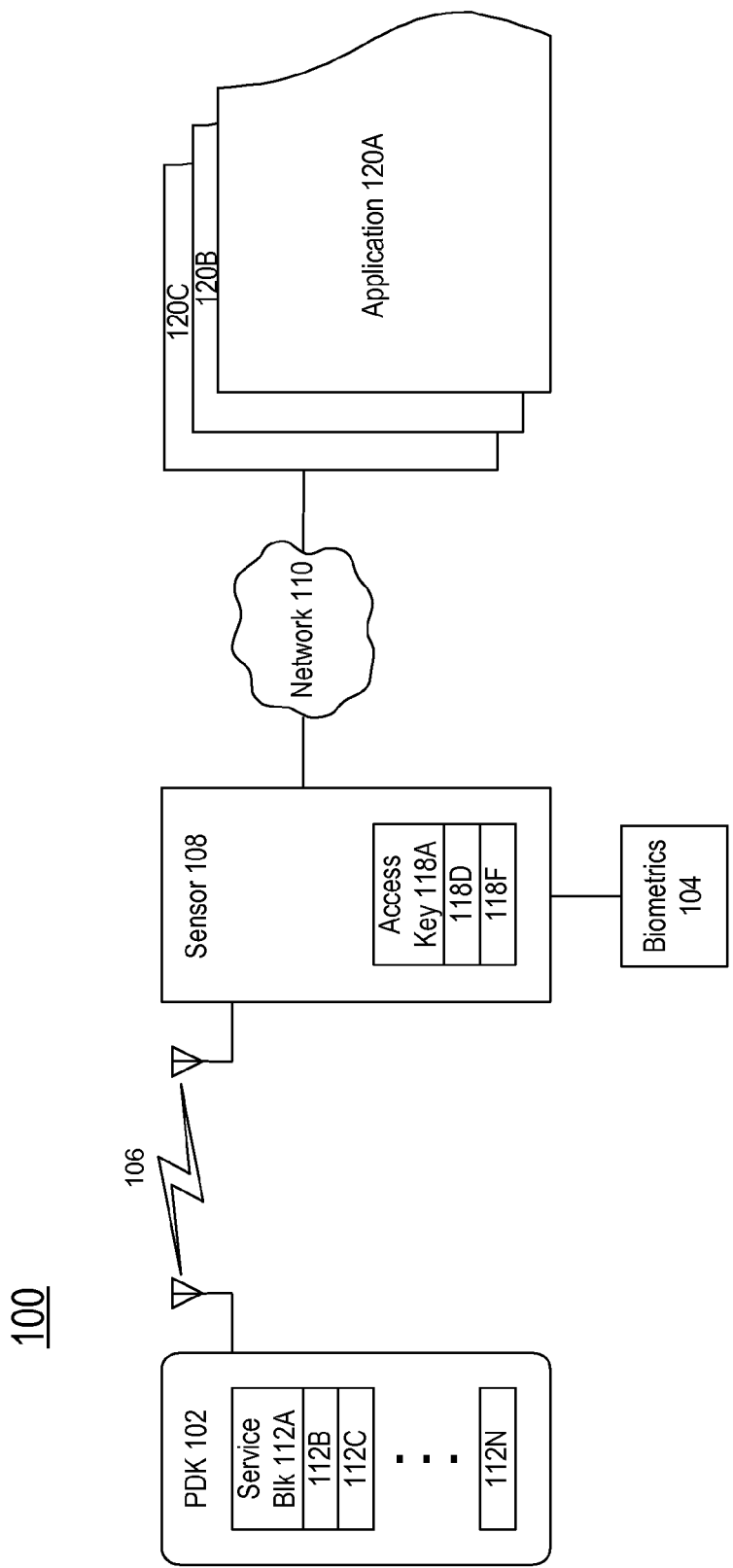
FIG. 1 is a block diagram illustrating one embodiment of a system according to the invention.

FIG. 1 is a high level block diagram illustrating a system for allowing access to multiple applications (or services). The system 100 comprises a Personal Digital Key (PDK) 102, a sensor 108, a network 110 and one or more applications 120 (including services). The sensor 108 is coupled to the PDK 102 by a wireless link 106 and coupled to a network 110 by either a wired or wireless link. In this example, the applications 120 are also accessed over network 110. The sensor 108 is also adapted to receive a biometric input 104 from a user and is capable of displaying status to a user. In alternative embodiments, different or additional resources and databases may be coupled to the network 110, including for example registries and databases used for validation or to check various registrations of the user. In another embodiment, the sensor 108 operates as a standalone device without a connection to the network 110.

Figure 2:
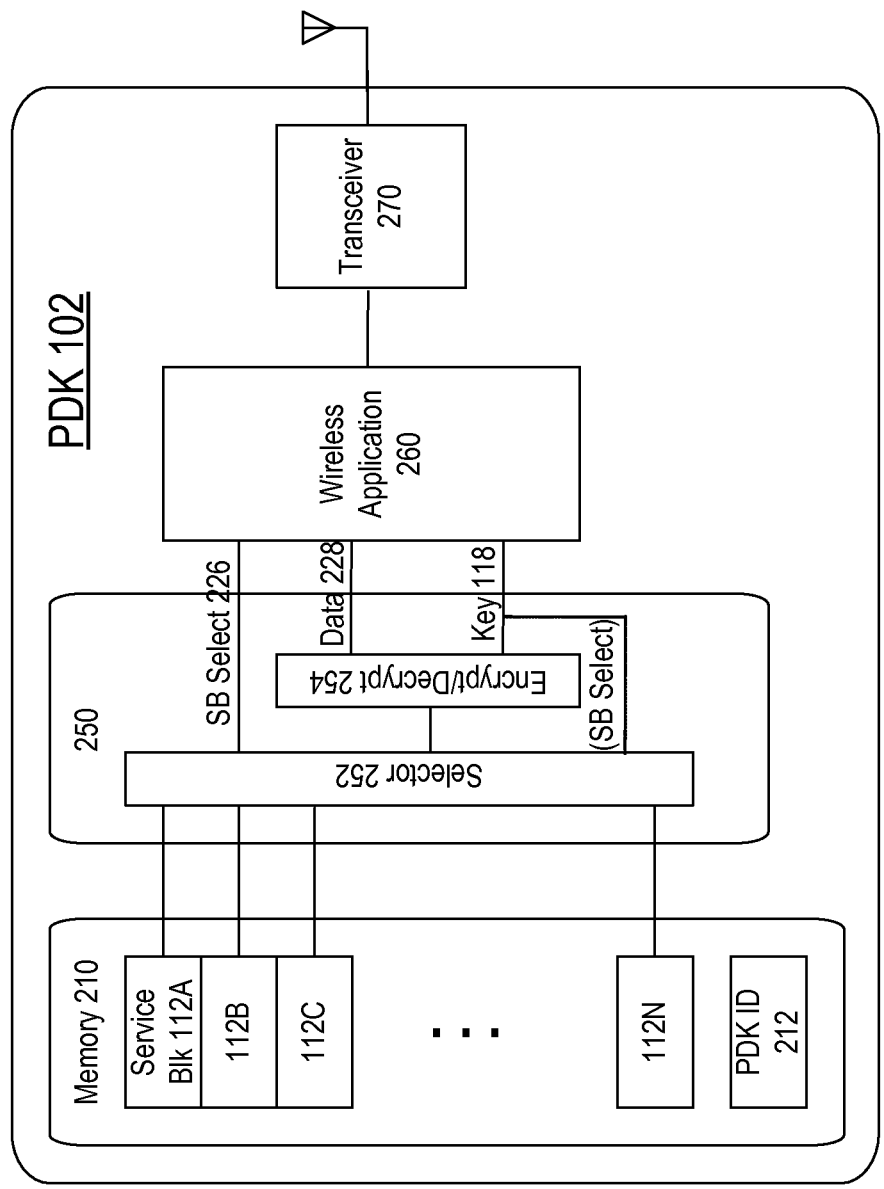
FIG. 2 is a block diagram illustrating one embodiment of a Personal Digital Key (PDK).

The PDK 102 includes multiple service blocks 112A-N as described in more detail in FIG. 2. Each service block 112 is accessed using a corresponding service block access key 118. In this example, the sensor 108 contains three of the service block access keys 118A,D,F. The service block access keys 118 allow the sensor 108 to unlock information stored in the corresponding service blocks 112, which information is used as local secured information.

In one example, a biometric is required in order to access specific service blocks 112 in the PDK 102. Verification of the biometric is achieved by using service block 112A. The sensor 108 stores the corresponding service block access key 118A and uses this key to unlock the biometric service block 112A, which stores a valid biometric. A current biometric is received using biometric input 104. The sensor 108 then verifies the stored biometric (from service block 112A) against the recently acquired biometric (from input 104). Upon proper verification, various applications 120 are permitted to connect to the PDK 102 via the sensor 108 and/or to gain access to other service blocks 112.

The system 100 can be used to address applications 120 where it is important to authenticate an individual for use. Generally, the sensor 108 wirelessly receives information stored in the PDK 102 that uniquely identifies the PDK 102 and the individual carrying the PDK 102. The sensor 108 can also receive a biometric input 104 from the individual. Based on the received information, the sensor 108 determines if access to the application 120 should be granted. In this example, the system 100 provides authentication without the need for PINs or passwords (although PINs and passwords may be used in other implementations). Moreover, personal biometric information need not be stored in any local or remote storage database and is only stored on the user's own PDK (in one embodiment).

The credibility of the system 100 is ensured by the use of a PDK 102 that stores trusted information. The PDK 102 is a compact, portable uniquely identifiable wireless device typically carried by an individual. The PDK 102 stores digital information in a tamper-proof format that uniquely associates the PDK 102 with an individual. Example embodiments of PDKs are described in more detail in U.S. patent application Ser. No. 11/292,330, entitled "Personal Digital Key And Receiver/Decoder Circuit System And Method" filed on Nov. 30, 2005; U.S. patent application Ser. No. 11/620,581 entitled "Wireless Network Synchronization Of Cells And Client Devices On A Network" filed on Jan. 5, 2007; and U.S. patent application Ser. No. 11/620,577 entitled "Dynamic Real-Time Tiered Client Access" filed on Jan. 5, 2007, the entire contents of which are all incorporated herein by reference.

The sensor 108 wirelessly communicates with the PDK 102 when the PDK 102 is within a proximity zone (i.e., within a microcell) of the sensor 108. The proximity zone can be, for example, several meters in radius and preferably can be adjusted dynamically by the sensor 108. Thus, in contrast to many conventional RF ID devices, the sensor 108 can detect and communicate with the PDK 102 without requiring the owner to remove the PDK 102 from his/her pocket, wallet, purse, etc. Generally, the sensor 108 receives uniquely identifying information from the PDK 102 and initiates an authentication process for the individual carrying the PDK 102. In one embodiment, the sensor 108 is adapted to receive a biometric input 104 from the individual. The biometric input 104 comprises a representation of physical or behavioral characteristics unique to the individual. For example, the biometric input 104 can include a fingerprint, a palm print, a retinal scan, an iris scan, a photograph, a signature, a voice sample or any other biometric information such as DNA, RNA or their derivatives that can uniquely identify the individual. The sensor 108 compares the biometric input 104 to information received from the PDK 102 to determine authentication. Alternatively, the biometric input 104 can be obtained by a biometric sensor on the PDK 102 and transmitted to the sensor 108 for authentication. In additional alternative embodiment, some or all of the authentication process can be performed by the PDK 102 instead of the sensor 108.

In this example, the sensor 108 is further communicatively coupled to the network 110 in order to receive and/or transmit information to remote databases for remote authentication. In an alternative embodiment, the sensor 108 includes a non-volatile data storage that can be synchronized with one or more remote databases or registries. Such an embodiment alleviates the need for a continuous connection to the network 110 and allows the sensor 108 to operate in a standalone mode and for the local data storage to be updated when a connection is available. For example, a standalone sensor 108 can periodically download updated registry entries and perform authentication locally without any remote lookup.

In yet another alternative, a standalone sensor 108 may have a pre-configured secure access key 118 and encryption algorithm, or a variable access key 118 that changes, for example based on time and sensor ID. One example application would be a sensor 108 located in a hotel room door, where the sensor could constantly compute a different access key 118 based on time, and the PDK 102 could be associated with this key during the hotel registration process.

The network 110 provides communication between the sensor 108 and various validation databases and/or registries, in addition to the applications 120. In one embodiment, the network 110 uses standard communications technologies and/or protocols. Thus, the network 110 can include links using technologies such as Ethernet, 802.11, 802.16, integrated services digital network (ISDN), digital subscriber line (DSL), asynchronous transfer mode (ATM), etc. Similarly, the networking protocols used on the network 110 can include the transmission control protocol/Internet protocol (TCP/IP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

In one aspect, the sensor 108 may connect to a validation database that stores additional information that may be used for authorizing a transaction to be processed at the sensor. For example, in purchase transactions, the sensor 108 may interact with a credit card validation database that is separate from the merchant providing the sale. Alternatively, a different database may be used to validate different types of purchasing means such as a debit card, ATM card, or bank account number.

In another aspect, the sensor 108 may connect to various registries that store, among other items, PDK, notary, and/or sensor information. In one embodiment, a registry stores biometric or other types of information in an encoded format that can only be recovered using an algorithm or encoding key stored in the PDK. Information stored in the registries can be accessed by the sensor 108 via the network 110 for use in the authentication process. Two basic types of registries are private registries and a Central Registry. Private registries are generally established and administered by their controlling entities (e.g., a merchant, business authority, or other entity administering authentication). Private registries can be custom configured to meet the specialized and independent needs of each controlling entity. A Central Registry is a highly-secured, centrally-located database administered by a trusted third-party organization. In one embodiment, all PDKs 102 are registered with the Central Registry and may be optionally registered with one or more selected private registries. In alternative embodiments, a different number or different types of registries may be coupled to the network 110.

The service blocks 112 can be used for purposes other than user authentication. For example, information used or produced by an application 120 can be transferred back and forth to the corresponding service block 112. That is, each service block 112 can be used as a local secure memory for the corresponding application 120. Thus, a service 120B may store certain sensitive information in service block 112B, and a separate service 120C will not be able to access that information without the corresponding access key 118B. In this example, the sensor 108 only holds access keys 118A,D,F and does not hold access key 118B. The application 120B may hold the access key 118B, thus allowing it to access service block 112B but preventing application 120C from accessing the service block 112B. Note that this implementation would also prevent the sensor 108 acting alone from accessing the service block 112B.

Turning now to FIG. 2, an example embodiment of a PDK 102 is illustrated. The PDK 102 comprises a memory 210, control logic 250, wireless application 260 and a transceiver 270. The PDK 102 can be standalone as a portable, physical device or can be integrated into commonly carried items. For example, a PDK 102 can be integrated into a portable electronic device such as a cell phone, Personal Digital Assistant (PDA), or GPS unit, an employee identification tag, clothing, or jewelry items such as watches, rings, necklaces or bracelets. In one embodiment, the PDK 102 can be, for example, about the size of a Subscriber Identity Module (SIM) card and be as small as a square inch in area or less. In another embodiment, the PDK 102 can be easily contained in a pocket, on a keychain, or in a wallet. The PDK can also contain other components not shown, for example various other inputs, outputs and/or interfaces (serial or parallel).

The memory 210 can be a read-only memory, a once-programmable memory, a read/write memory or any combination of memory types, including physical access secured and tamperproof memories. The memory 210 typically stores a unique PDK ID 212. The PDK ID 212 comprises a public section and a private section of information, each of which can be used for identification and authentication. In one embodiment, the PDK ID 212 is stored in a read-only format that cannot be changed subsequent to manufacture. The PDK ID 212 is used as an identifying feature of a PDK 102 and distinguishes between PDKs 102 in private or Central registry entries. In an alternative embodiment, the registries can identify a PDK 102 by a different ID than the PDK ID 212 stored in the PDK 102, or may use both the PDK ID 212 and the different ID in conjunction. The PDK ID 212 can also be used in basic PDK authentication to ensure that the PDK 102 is a valid device.

The memory 210 also stores the various service blocks 112A-N. Whether a particular service block 112 is stored in volatile or non-volatile memory may be determined by the specific application. In one approach, the original issuer of the PDK defines how the internal memory 210 may be used for service blocks 112. In some cases, the issuer may choose to only allow their service blocks to be stored, in which case third party applications will not be able to store service blocks in memory 210. In other cases, the issuer may allow any third party service 120 to use available service blocks 112. If a new service block is created, then memory for that service block is allocated. The specific location of the service block and generation of the corresponding service block access key can be handled by the PDK 102, or can be handled via an external service.

Regardless of how created, once created, external applications (such as applications 120 in FIG. 1) can gain access to a specific service block 112 by proving the corresponding access key 118. In FIG. 2, this is shown conceptually by control logic 250. The wireless application 260 on the PDK 102 communicates to the sensor (not shown in FIG. 2) via transceiver 270. The wireless application provides a service block select 226 and a service block access key 118 in order to store, retrieve and/or modify data in a service block 112. The selector 252 selects a service block 112 based on the select signal 226 and the access key 118. The encryption engine 254 encrypts/decrypts data 228 flowing to/from the service block 112 based on the access key 118 (or some other key generated based on the access key, for example a session key). In an alternate method, the service block 112 may be selected based on the service block access key 118, eliminating the need for a separate select signal 226.

The PDK 102 may also include other data and applications. For example, the PDK 102 typically will include various profiles. Many different types of profiles are possible. A biometric profile, for example, includes profile data representing physical and/or behavioral information that can uniquely identify the PDK owner. A PDK 102 can store multiple biometric profiles, each comprising a different type of biometric information. The same biometric information can also be stored multiple times in a PDK 102. For example, two different applications may use the right index fingerprint, and that biometric information may be stored in two different service blocks, one for each application. In addition, the PDK 102 may also store one or more biometric profile "samples" associated with each biometric profile. Profiles may also store one or more PINs or passwords associated with the PDK owner, or one or more pictures of the PDK owner. A profile can further include personal identification information such as name, address, phone number, etc., bank information, credit/debit card information, or membership information. This information can be useful for transactions.

The transceiver 270 is a wireless transmitter and receiver for wirelessly communicating with a sensor 108 or other wireless device. The transceiver 270 can send and receive data as modulated electromagnetic signals. Moreover, the data can be encrypted by the transceiver 270 and transmitted over a secure link. Further, the transceiver 270 can actively send connection requests, or can passively detect connection requests from another wireless source. In one embodiment, the transceiver 270 is adapted to communicate over a range of up to around 5 meters. In another embodiment, the transceiver 270 range can be varied.

Figure 3:
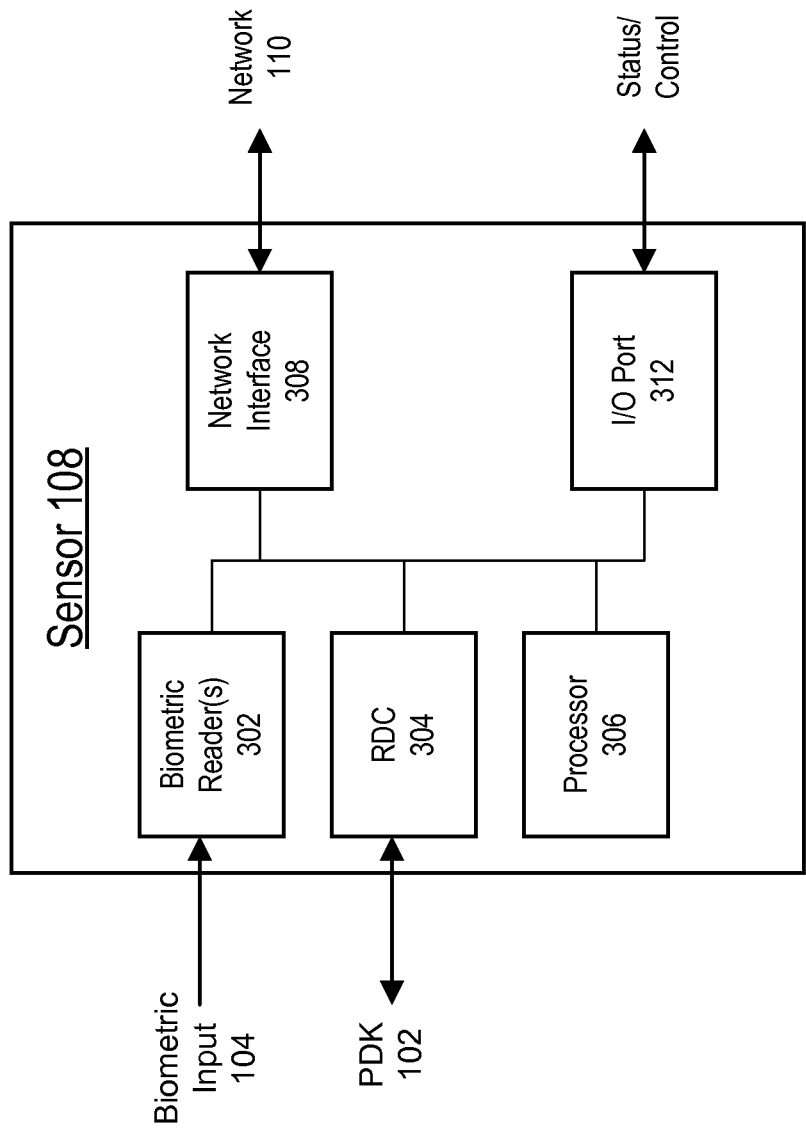
FIG. 3 is a block diagram illustrating one embodiment of a sensor.

Turning now to FIG. 3, an example embodiment of a sensor 108 is illustrated. The embodiment includes one or more biometric readers 302, a receiver-decoder circuit (RDC) 304, a processor 306, a network interface 308 and an I/O port 312. In alternative embodiments, different or additional modules can be included in the sensor 108.

The RDC 304 provides the wireless interface to the PDK 102. Generally, the RDC 304 wirelessly receives data from the PDK 102 in an encrypted format and decodes the encrypted data for processing by the processor 306. An example embodiment of an RDC is described in U.S. patent application Ser. No. 11/292,330 entitled "Personal Digital Key And Receiver/Decoder Circuit System And Method," the entire contents of which are incorporated herein by reference. Encrypting data transmitted between the PDK 102 and sensor 108 minimizes the possibility of eavesdropping or other fraudulent activity. In one embodiment, the RDC 304 is also configured to transmit and receive certain types of information in an unencrypted, or public, format.

The biometric reader 302 receives and processes the biometric input 104 from an individual. In one embodiment, the biometric reader 302 is a fingerprint scanner. Other embodiments of biometric readers 302 include retinal scanners, iris scanners, facial scanner, palm scanners, DNA/RNA analyzers, signature analyzers, cameras, microphones, and voice analyzers. Furthermore, the sensor 108 can include multiple biometric readers 302 of different types.

The network interface 308 can be a wired or wireless communication link between the sensor 108 and network 110. For example, in one type of authentication, information is received from the PDK 102 at the RDC 304, processed by the processor 306, and transmitted to external authentication databases through the network interface 308. The network interface 308 can also receive data sent through the network 110 for local processing by the sensor 108. In one embodiment, the network interface 308 provides a connection to a remote system administrator to configure the sensor 108 according to various control settings.

The I/O port 312 provides a general input and output interface to the sensor 108. The I/O port 312 may be coupled to any variety of input devices to receive inputs such as a numerical or alphabetic input from a keypad, control settings, menu selections, confirmations, and so on. Outputs can include, for example, status LEDs, an LCD, or other display that provides instructions, menus or control options to a user.

Figure 4:
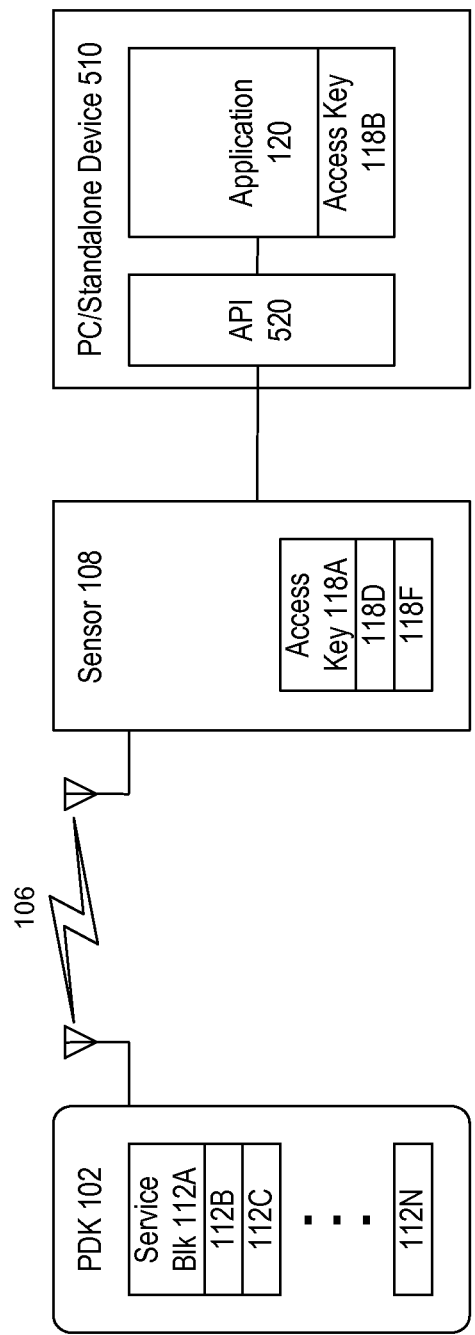
FIGS. 4-6 are block diagrams illustrating further embodiments of systems according to the invention.
Figure 5:
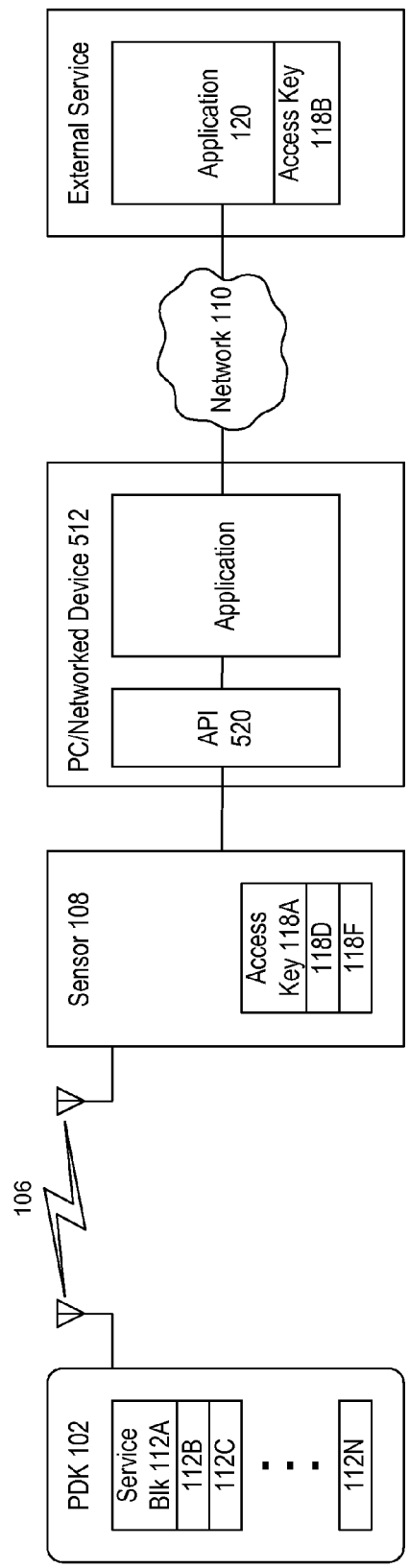
Figure 6:
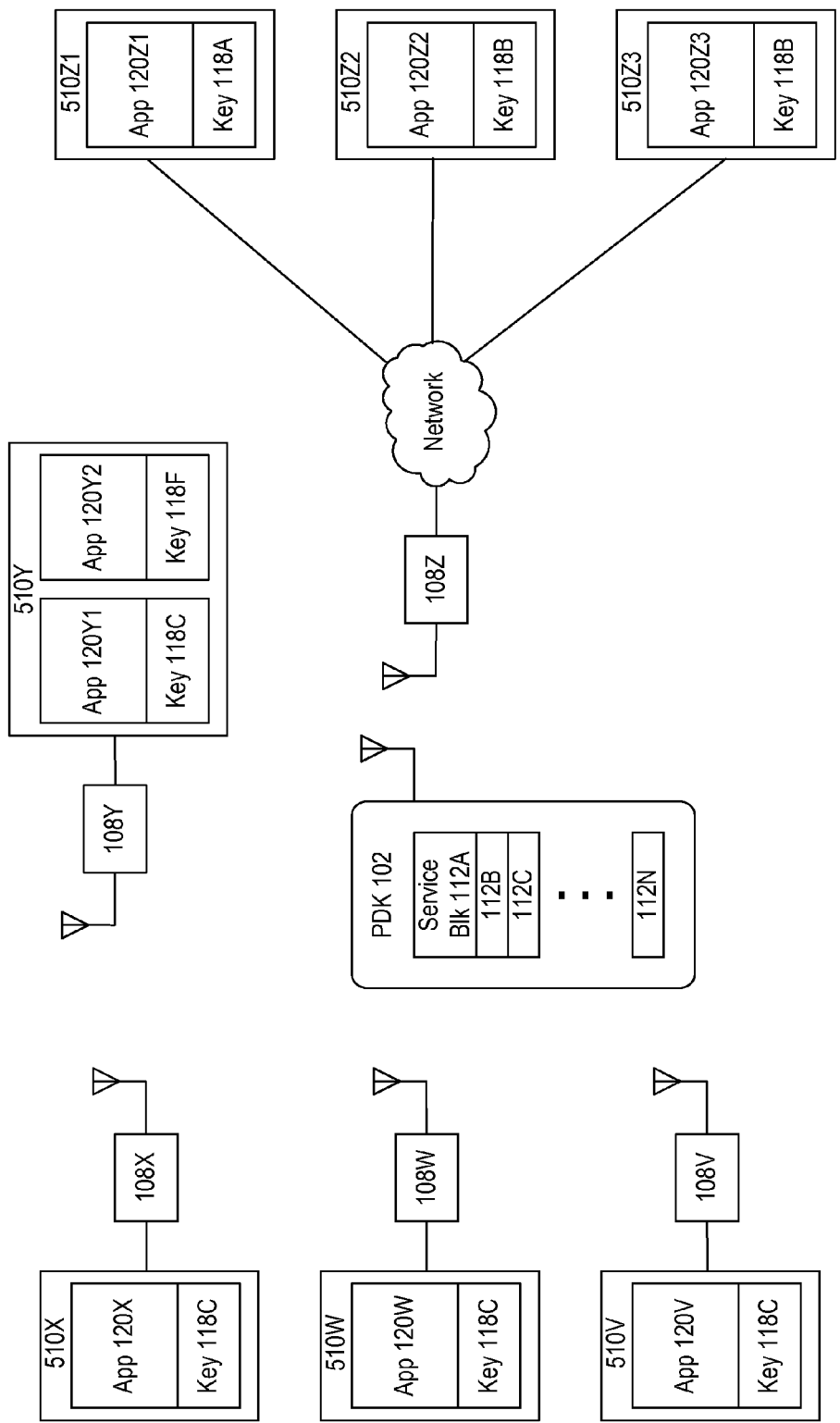

FIGS. 4-6 are high level block diagrams illustrating additional examples of applications accessing service blocks. FIGS. 4 and 5 illustrate that the application 120 need not be located at any particular location on the network. Rather, the service block 112 is accessed from any application 120 that can attach (in a network sense) to the sensor 108.

In FIG. 4, the sensor 108 attaches to the PDK 102 within its microcell, using service block access key 118(A) and service block 112(A). A personal computer or other standalone device 510 is attached to the sensor 108, either directly or via a network. In this example, the device 510 communicates with the sensor via a standardized API 520. An application 120 executes on the device 510 and has access to the service block access key 118(B). It uses this key to gain access to the corresponding service block 112(B). This is an example of a local application 120.

FIG. 5 illustrates a remote application. In this example, the sensor 108 attaches to the PDK 102 in the same manner as FIG. 4, using service block access key 118A and service block 112A. However, application 120 is not executing on a local device. Rather, it executes remotely. Here, it is shown as an external service 120. However, service 120 can still gain access to service block 112B by use of service block access key 118B, although it does so via network 110 and intermediate device 512. Although the sensor 108 is the device that attaches to the PDK 102, a local or remote application 120 with the right credentials may store or retrieve information in a service block 112 in the PDK 102.

The PDK itself can also be configured to prevent the same source from repeating invalid access attempts to the PDK's service blocks. The PDK may monitor access to the service blocks. When an attached service makes multiple unsuccessful attempts to unlock a service block, the PDK tracks this and eventually ignores the requests from that service for a period of time. Alternately, the PDK may disconnect from the network or take other actions.

An example of a local application (FIG. 4) is an auto login/logoff of a personal computer. When a PDK 102 is within the proximity of the personal computer 510, the PDK 102 is detected and the sensor 108 attaches to the PDK 102 (using service block 112A). The login/logoff application 120 then sends the service block access key 118B along with a request for the contents of the service block 112B to the PDK 102 via the sensor 108. For example, a standard may specify that particular service block 112B contains username and password. These are returned to the application 120, allowing automatic login to the personal computer 510.

An example of a remote application (FIG. 5) is a credit card transaction. The sensor 108 in this case could be a credit card terminal. When the PDK 102 is brought in close proximity, the credit card terminal 108 attaches to the PDK 102 (using service block 112A). The terminal 108 then sends the PDK ID 212 to the credit card issuer (the external service) for identification. The credit card issuer may then send a service block access key 118B back to the sensor 108, where it is passed on to the PDK 102 to unlock a specific service block 112B. The contents of the service block 112B could then be sent back to the credit card issuer where further decryption could occur and the credit card holder could be verified. Once verified, the credit card terminal displays that the transaction is approved.

These two examples illustrate basic concepts of the capabilities of the service blocks and how an application (service) may use them. Since service blocks preferably are both readable and writable, services may use them as they see fit (i.e. debit, username/password, credit card information, etc.). In some sense, the service block acts as a secure local memory on the PDK.

FIGS. 4 and 5 illustrate a basic case where a single application accesses a single service block on a single PDK via a single sensor. The invention is not limited to this case. FIG. 6 illustrates a case with multiple applications, sensors, and service blocks. This illustrates the sharing of service blocks. As shown, service blocks may be limited to a single service or source or may be shared across multiple services and sources. A service block 112 is a protected memory element which allows an application 120 with the right credentials to access it. In this example, applications 120W, 120X and 120Y1 can each access service block 112C since each application has access to service block access key 1118C. Similarly, applications 120V, 120Z2 and 120Z3 can each access service block 112B. Although not shown in FIG. 6, it is also possible for an application to access more than one service block. FIG. 6 also shows a situation where applications 120Z1-3 running on different devices 510Z1-3 all access the PDK 102 through the same sensor 108Z. Each sensor 108 covers a certain proximity zone (i.e., microcell). The presence of the PDK 102 within a microcell indicates proximity of the PDK to that particular sensor.

Also shown is a device 510Y with two applications 120Y1 and 120Y2, each of which accesses a different service block. In some cases, the first application 120Y1 is enabled from a first service block 112C, thus allowing a second application 120Y2 to operate using a second service block 112F (although the two applications need not be on the same device 510). For example, the first application 120Y1 might be the auto login/logoff, where a user logs in to a personal computer via a service block 112C that provides a username and password. Now that the user is logged in, the user wishes to attach to his credit card company. The user types in the web address of the credit card provider, where the credit card provider requests the user's credentials. First, the user may have to provide some live biometric information. Application 120Y2 compares this against a biometric stored in a second service block 112F on the PDK. After the sensor 108Y verifies the correct biometrics, the sensor indicates to the PDK that external services may now access their service blocks. The credit card provider 120Z1 then sends its service block access key 118A to the PDK where this third service block 112A is retrieved and sent back to the credit card issuer. The credit card issuer then verifies the data and authorizes the user's transaction.

Furthermore, although the above scenarios focus mostly on service blocks in the PDK, applications may also use the basic authentication function that allows the PDK and sensor to verify each other. In this scenario, once the sensor and PDK finish their verification the application is signaled. The application may then use this information as an assurance that the PDK is a legitimate device (but not necessarily that the holder of the device is legitimate).

In certain cases, access to a service block 112 may allow the application 120 to access various input/outputs on the PDK. For example, the PDK may have several inputs and/or outputs, as well as a serial (or other) interface. The inputs may be either transition triggered or level triggered. An example of a transition triggered event might be a button press, where level triggered might be turning a switch on. Multiple outputs may also exist where they may also be pulsed or level outputs. Finally an interface may allow attachment of an external device, which may then send data through the PDK to the application. In many cases, the inputs and outputs may be simple push button switches and LEDs used to allow a user to interact with an application.

Since the number of applications is limitless, different applications may use the inputs and outputs for different functionality. For example, a user walking into a casino may require attention from a service representative and if the casino has enabled button 1 for this functionality, when the user depresses button 1, an attendant is alerted with information related to the user and the location of the user. In a different application, an actual button may not exist, but it may be tied to an output of another device indicating when a piece of equipment was in use. Whenever the device was in use, the PDK transmits the input 1 active alert back to the backend application. The backend application may then be using this information to determine when the equipment must be recalibrated based on its usage.

This is also true for outputs and any interfaces. Outputs may be used to turn on a light or sound an audible tone used to locate an asset in a building. For example, there may be 20 pieces of equipment in a room which all show up using a location tracking program, but the user would then have to sift through each piece of equipment until the right one is located. Using an output as described above, a light could be lit and the equipment could be immediately located within the room. The interface allows another attached application to the PDK to send information to an end application attached to the sensor. In this case the sensor provides a medium to push data to an external source.

Figure 7:
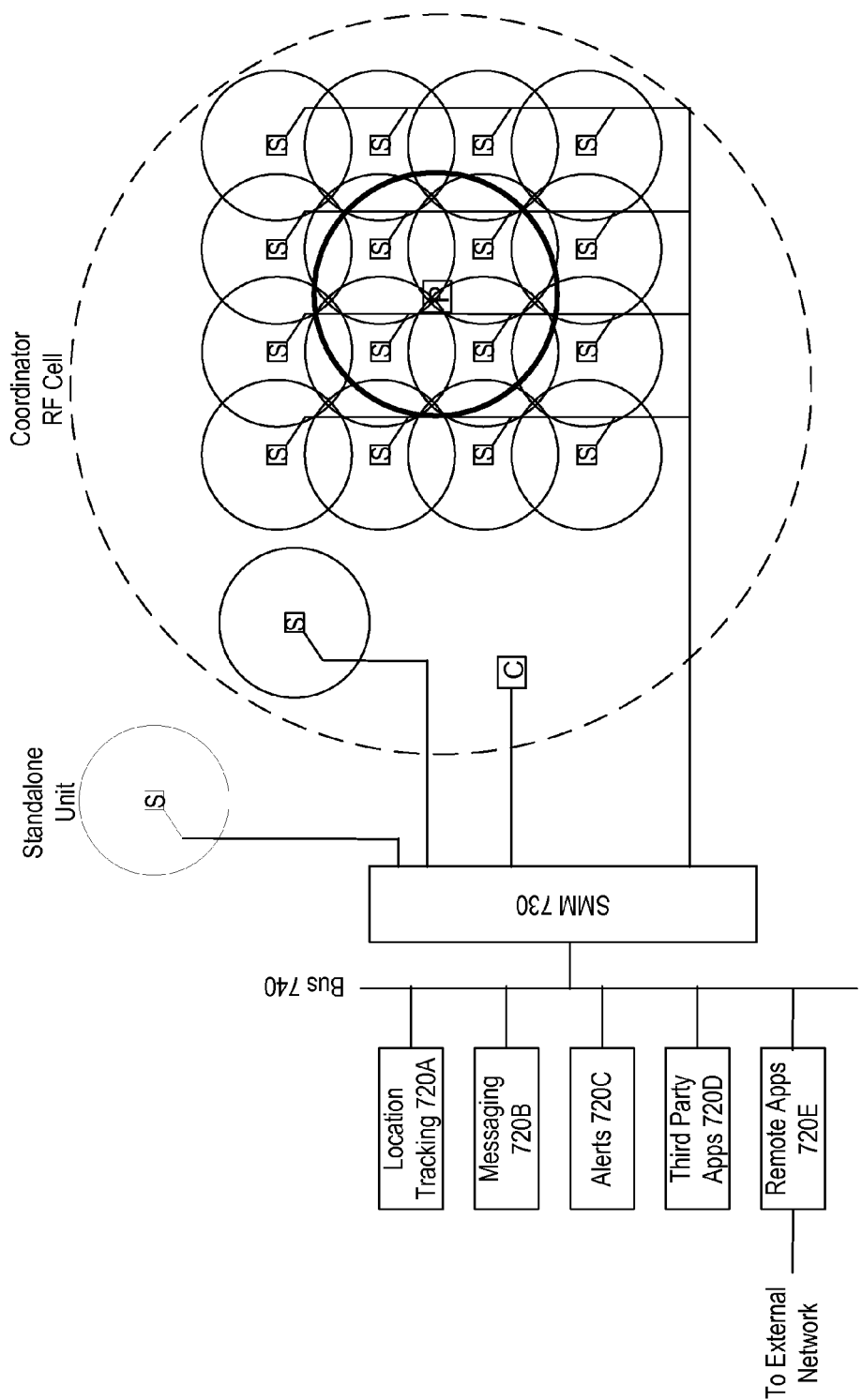
FIG. 7 is a block diagram illustrating one embodiment of a system with networked sensors.

FIG. 7 is a high level block diagram illustrating one embodiment of a system with networked sensors. In this example, multiple sensors (marked "S") are attached to a Sensor Management Module (SMM) 730. The SMM 730 provides data routing for the sensors (e.g., to and from applications 720A-E). In this example, the SMM 730 also receives data from the sensors and processes this data to provide location tracking of PDKs (marked "P") that are within the sensor field. In this implementation, the system also includes an application layer message bus 740, over which the SMM 730 and applications 720 can exchange messages. This allows multiple applications 720 to simultaneously communicate with PDKs and make use of the location tracking of the PDKs. The application layer message bus 740 may also be extended to other applications via a remote application interface.

In FIG. 7, each sensor's microcell (i.e., proximity zone) is denoted by a circle around the sensor. Similarly, the PDK's range is shown by the heavy larger circle. In the example shown, the PDK is in range of four different sensor zones and any of the four sensors may establish communications to the PDK. Using a network topology as shown, the SMM may instruct a specific sensor to attach to the PDK. Once established, the communication link will allow the PDK to communicate with various applications 720, in this example via the SMM 730 and bus 740. Applications 720 will be able to access service blocks on the PDK through the use of service block access keys, as described above.

In addition, in this example, the sensors are at known locations, preferably at fixed locations. For example, sensors may be distributed throughout a building or other structure or site (including outdoors). The sensors interact with the PDK in a manner that allows the sensors to gather position data about the PDK. This position data is sent by the sensors to the SMM 730, which processes the data to determine the PDK's position and to provide location tracking of the PDK over time. The position and/or location tracking information can then be made available to applications 720 via bus 740, in addition to allowing the applications 720 to communicate with the PDK.

Location tracking of the PDK by the sensor network can be achieved in different ways, one of which will be described below. The example in FIG. 7 uses a coordination module (marked "C") or simply coordinator, although this is not required in other implementations. The large dashed circle shows the coordinator's cell. In this example, the sensors preferably contain two transceivers, one to communicate with the coordinator on what will be referred to as the control channel and another to communicate with the PDK on what will be referred to as the traffic channel.

Figure 8:
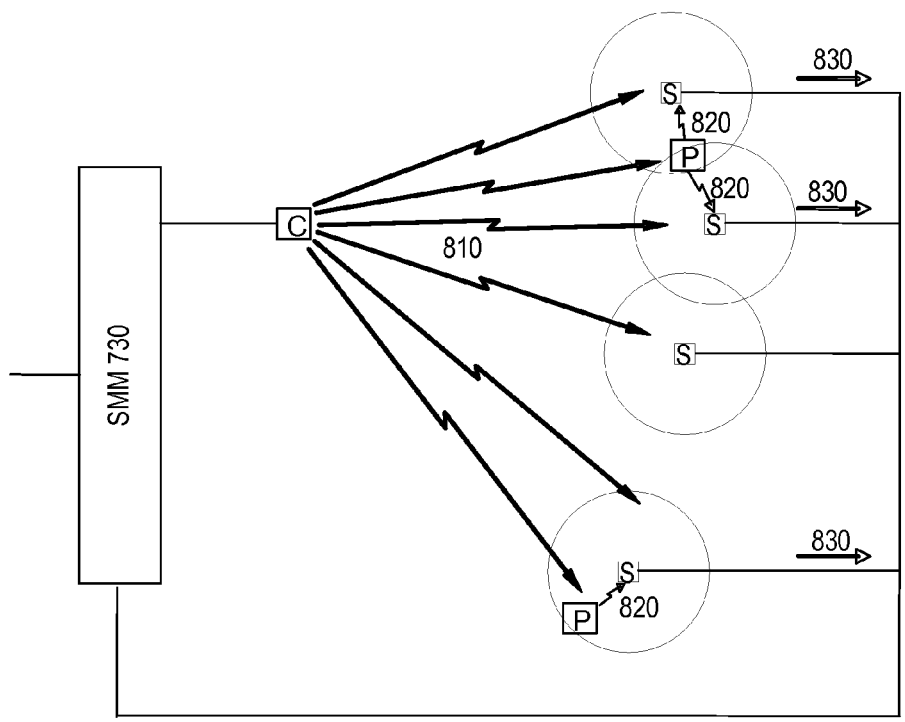
FIGS. 8-9 are block diagrams illustrating operation of the system in FIG. 7.

FIG. 8 illustrates operation of the system in FIG. 7. The coordinator C broadcasts 810 a periodic beacon on a control channel. The sensors and PDKs synchronize to this periodic beacon. On the control channel, when a sensor is not receiving the broadcasted beacon, it is timesharing between listening for a PDK ALOHA response and possibly sending a command to a specific PDK. The PDK, after detecting the beacon, remains on the control channel and continues to periodically wake up, receive the beacon, and realign its timing. By using system related information found in the beacon and its own serial number, the PDK calculates the wakeup time to synchronize to the beacon and broadcast 820 an ALOHA response. As shown, the PDK's broadcasted ALOHA response may overlap several sensors causing multiple sensors to receive the information simultaneously. Each sensor that receives an ALOHA response from a PDK performs a store and forward 830 of the responses to the SMM 730 on a periodic basis.

The coordinator and sensors communicate to the SMM 730 via a backend network. This communications method used to attach each device to the SMM may be wired or wireless provided it has the bandwidth required to transport the information between the devices. When a PDK ALOHA response is detected by a sensor, the sensor collects information such as the PDK ID, receiver signal strength indication, and timestamp. After receiving this information from the sensors, the SMM independently applies the new information for each PDK from the sensors, to the previous history of that PDK and through location deterministic algorithms computes the most likely sensor microcell in which the PDK is located. There are multiple known algorithms for doing so. In one approach, location (proximity) is determined based on prior location history, time at the current location, RF signal strength and geographic contours. The SMM may also store the raw data for further alternate processing methods or for diagnostic purposes.

The SMM 730 can broadcast this information on the application layer messaging bus 740 for applications 720 to use. For example, one application 720A might be a location tracking application with a graphical user interface that shows the current position or trail of the PDK. The SMM 730 (or applications 720) may also store the location information and make it available on an on-demand basis.

In this particular example, access is allocated using a time division multiple access (TMDA) system, where an RF logical channel is distributed over time and each device has a specific period known as a timeslot in which they are allowed to respond. Each timeslot has a preamble and timeslot synchronization character followed by a packet, and lastly a guard period. The content of each packet is dependent on the source device, channel type (control or traffic), and timeslot location.

For example, the coordinator broadcasts the beacon on a period basis. All sensors and PDKs receive the beacon. Each PDK then broadcasts its ALOHA response at a specific timeslot allocated for that purpose. In addition to the handshake messages that occur on the control channel, the beacon and ALOHA response may also carry auxiliary data. This data may be in the form of an alarm indication, command/status, or user/application data, for example. It could be provided by an end application, SMM network command, external device interface (such as a terminal interface), or via an internal alarm functions such as low battery, input signal change, or setting an output signal polarity.

After an ALOHA response is broadcast from a PDK, the PDK listens for a command from nearby sensors. Based on the type of PDK and time it is present in one geographical location, one or more nearby sensors that detected the ALOHA response, may also send additional paging or auxiliary data in the sensor command response timeslot for a specific PDK.

Other timeslots can be allocated to traffic channels and/or to other messages over the control channel. Various TDMA approaches can be used to allocate the wireless communications channel. Non-TDMA approaches can also be used.

The sensor network system of FIG. 7 provides a closed loop system. With the SMM 730 being the central hub, broadcasting auxiliary data through the coordinator (and sometimes sensor devices) and collecting PDK auxiliary data through the sensors, it is possible to determine if in an asymmetrical system a command was successfully completed.

Figure 9:
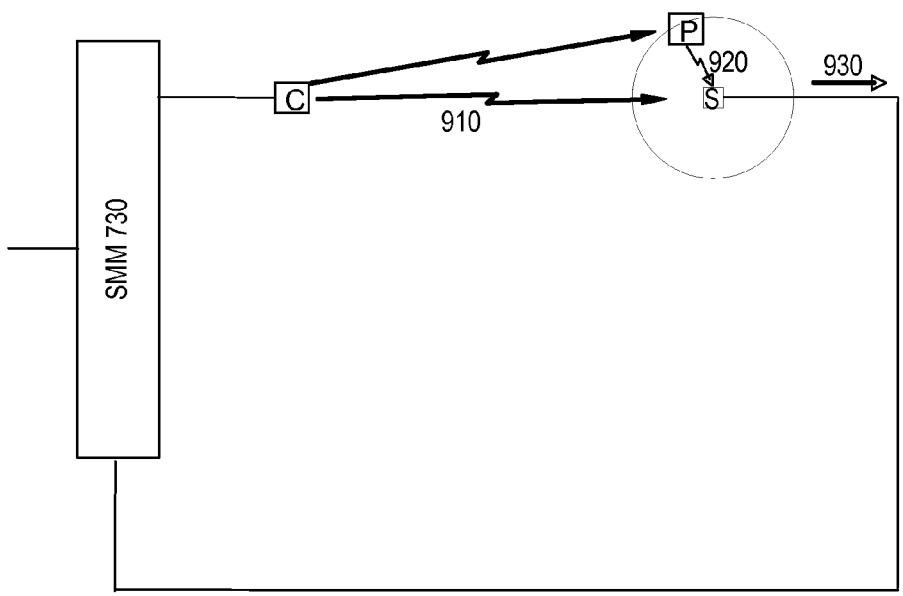

FIG. 9 illustrates an example of how the closed loop system works. In step 910, the SMM 730 (via the coordinator) broadcasts a beacon that also contains auxiliary information. This auxiliary information contains a command from an application 720 to be executed by the PDK. Assume that, for this particular command, the PDK is expected to acknowledge execution of the command. After the PDK executes the command, the PDK sends 920 the acknowledge message as auxiliary data in one of the PDK's ALOHA responses. The sensor receives the ALOHA response and passes 930 the information back to the SMM 730. The SMM 730 has now verified that the command was successfully executed. Such commands could be as simple as set an output to turn on a light or generate an audible sound. It is also possible that an application 720 attached to the SMM 730 may request to pass data to the specific PDK where that data may then be passed to an external terminal application where the system acts only as a transport mechanism. In this mode, the applications attached at each end would be responsible for verifying and acknowledging the data was sent and received successfully.

Figure 10:
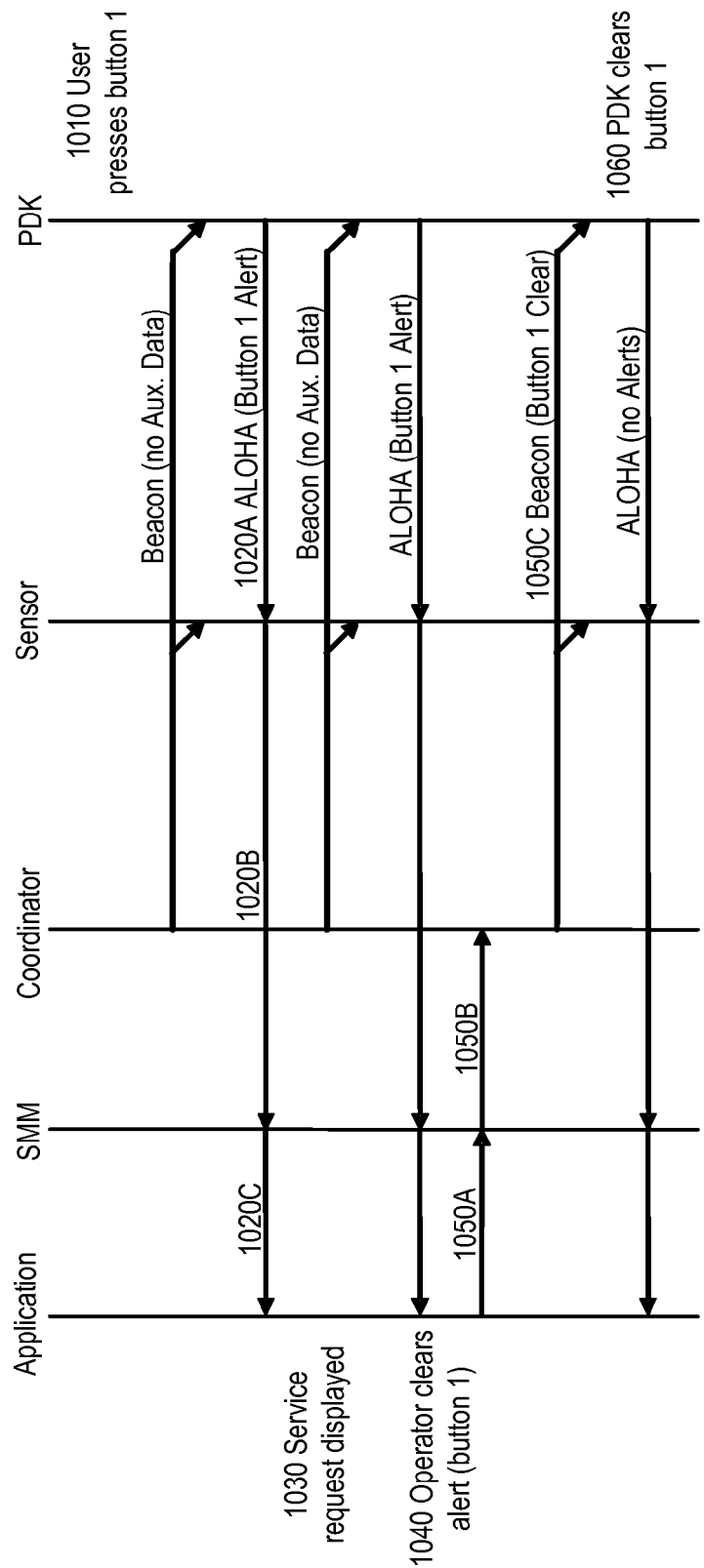
FIG. 10 is a diagram illustrating operation of the system in FIG. 7.

A second example is shown in FIG. 10, where the PDK initiates an alert. The coordinator periodically transmits a beacon and the PDK periodically returns an ALOHA response. In the example, a user carrying a PDK is located within a service oriented business, such as a department store, casino, restaurant, etc. The user desires to talk with a service representative from the organization and depresses 1010 the service button on their PDK (button 1). The next time the PDK wakes up to send an ALOHA response, the PDK attaches the button 1 alert to the ALOHA messages and broadcasts 1020A it. A local sensor receives the location response containing the button 1 alert and eventually sends 1020B the received ALOHA responses back to the SMM. The SMM may reformat the data and passes 1020C the indication back to the application. The application then indicates 1030 a button 1 request from the particular PDK serial number (and other related user information) on the application console. The PDK continues to send back the button 1 alert until cleared or a timeout period occurs. This allows devices that have inadequate coverage (e.g., on the edge of a cell boundary) to continue to send the alert until detected.

Eventually the console operator becomes aware of the service request and dispatches a representative to the user and clears 1040 the button 1 alert on the console. The clear button 1 alert is then sent 1050A-B to the coordinator where it is queued to go out 1050C on the proper beacon when the PDK will be awake. Once the PDK wakes up and receives 1050C its next beacon, the PDK clears out 1060 the button 1 alert indicator and returns to a basic ALOHA state with no auxiliary data pending.

The example shown may have also had a visible indicator in the PDK where the visible indicator may have become lit when the button was depressed. Once the button 1 alert was cleared the indicator would be unlit.

In this example, neither the application nor SMM verified the PDK actually received the clear button 1 alert. In one approach, each auxiliary message (page, alert, etc.) sent by a device contains a sequence number. If a device continues to send the information after it is acknowledged or cleared, the device is aware of the condition because of the sequence number. Any time a new auxiliary message is sent, the sequence number is incremented to alleviate the confusion as to how new or old any message is.

For some systems, redundancy is important. Redundancy can be implemented in the example system of FIG. 7 in a number of ways. For example, it is possible to provide multiple coordinators where these coordinators can be used to extend a coverage area or as a redundant backup. In one approach, each coordinator broadcasts its beacon on the same RF channel with a slight timing offset from the other coordinators. This creates a simulcast system where if one coordinator fails, the second coordinator can still resume system operation. This may also counter the issues of multipath by providing spatial diversity with the coordinators. Another redundancy measure is that information can be sent to PDK via the sensors, in addition to or in place of the coordinator. Another example of redundancy is that multiple sensor may receive messages from the PDK so there may be multiple paths back to the SMM via different sensors.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalent.

The invention claimed is:

1. A sensor network system comprising:
 a plurality of sensors at known locations, each sensor having a microcell and capable of communicating wirelessly with a personal digital key (PDK) in its microcell and gathering position data about such PDK, the PDK containing a memory having service blocks, each service block accessible by a corresponding service block access key, wherein a service block access key is distinct from a credential input by a user, wherein each sensor contains a service block access key, and wherein at least one service block access key is accessible by a plurality of applications and capable of accessing the corresponding service block;
 a sensor management module (SMM) communicatively coupled to the plurality of sensors and configured to facilitate communication with one or more applications;
 wherein the SMM and the sensor provide a data path between a service block on the PDK and an application that has access to the corresponding service block access key contained by the sensor; and the SMM receives the position data gathered by the sensors about a PDK, generates location tracking data for the PDK based on the position data and makes the location tracking data available to applications, and
 a coordinator module communicatively coupled to the SMM, the coordinator module having a coordinator cell, the coordinator module broadcasting a beacon to sensors and PDKs in its coordinator cell, the sensors and PDKs synchronizing to the beacon.

2. The system of claim 1 wherein the plurality of sensors are located inside a structure, and the SMM tracks location of the PDK within the structure.

3. The system of claim 1 wherein the plurality of sensors are located inside a building, the PDK is sized to be carried by a human, and the SMM tracks location of the PDK within the building.

4. The system of claim 1 wherein the application is a location tracking application.

5. The system of claim 1 wherein the application is a messaging application.

6. The system of claim 1 wherein the application is an application controlled by an entity different from the entity that controls the SMM.

7. The system of claim 1 wherein the application is a remote application that communicates with the SMM via a network.

8. The system of claim 1 further comprising:
 an application layer message bus that communicatively couples the SMM with the application.

9. The system of claim 1 wherein the PDK broadcasts a response to receipt of the beacon, those sensors in range of the PDK receiving the response and transmitting the response to the SMM.

10. The system of claim 1 wherein the sensor includes a biometric input.

11. The system of claim 1 wherein the sensor includes an input for non-biometric authentication data.

12. The system of claim 1 wherein different applications can have access to different service block access keys and the sensor and SMM provide a data path between each application and the corresponding service block(s) on the PDK.

13. The system of claim 1 wherein the sensor contains a service block access key and accesses the corresponding service block on the PDK.

14. A method for supporting applications for a personal digital key (PDK) located in a sensor network having a plurality of sensors at known locations and a sensor management module (SMM) communicatively coupled to the plurality of sensors, the method comprising:
 establishing a wireless communication channel between a sensor and the PDK in the sensor's microcell, the PDK containing a memory having service blocks, each service block accessible by a corresponding service block access key, wherein the service block access key is distinct from a credential input by a user and wherein at least one service block access key is accessible by a plurality of applications and capable of accessing the corresponding service block;

the sensor gathering position data about the PDK via the wireless communication channel;

the SMM receiving the position data gathered by the sensors about the PDK, generating location tracking data for the PDK based on the position data and making the location tracking data available to applications; and providing a data path between a service block on the PDK and an application that has access to the corresponding service block access key, the sensor containing the corresponding service block access key, the data path including the SMM and the sensor, and a coordinator broadcasting a beacon to the sensors and the PDK;

the sensors and the PDK synchronizing to the beacon;

the PDK broadcasting a response to receipt of the beacon; and the sensors receiving the response and transmitting the response to the SMM.

15. The method of claim 14 wherein the plurality of sensors are located inside a building, the PDK is sized to be carried by a human, and the SMM tracks location of the PDK within the building.

16. The method of claim 14 further comprising:

the beacon broadcast by the coordinator containing a command from an application, the command to be executed by the PDK;

the PDK executing the command; and a response from the PDK containing an acknowledgement of the command.

17. The method of claim 14 wherein the beacon broadcast by the coordinator contains auxiliary information from an application, the auxiliary information for the PDK.

18. The method of claim 17 further comprising: another coordinator broadcasting another beacon containing the auxiliary information to the sensors and the PDK.

19. The method of claim 14 wherein the response from the PDK contains auxiliary information from the PDK, the auxiliary information for the application.

20. The method of claim 14 further comprising:

more than one sensor receiving the response and transmitting the response to the SMM.

21. The method of claim 14 further comprising:

at least one of the sensor transmitting auxiliary information from an application to the PDK.

22. A sensor system comprising a sensor communicatively coupled to an application; the sensor capable of communicating wirelessly with a personal digital key (PDK) when the PDK is located within the sensor's microcell;

the PDK containing a memory having service blocks, each service block accessible by a corresponding service block access key, wherein the service block access key is distinct from a credential input by a user and wherein at least one service block access key is accessible by a plurality of applications and capable of accessing the corresponding service block;

the sensor providing a data path between a service block on the PDK and an application that has access to the corresponding service block access key, the sensor containing the corresponding service block access key, the sensor further capable of communicating with a coordinator when the sensor is located within the coordinator's coordinator cell, wherein the sensor and PDK synchronize to a beacon received from the coordinator.

23. The system of claim 22 wherein the sensor can be communicatively coupled to multiple applications over a network.

24. The system of claim 22 wherein different applications can have access to different service block access keys and the sensor provides a data path between each application and the corresponding service block(s) on the PDK.

25. The system of claim 22 wherein the sensor includes a biometric input.

26. The system of claim 22 wherein the sensor communicates with the applications via a standardized API.

27. The system of claim 22 wherein the sensor contains a service block access key and accesses the corresponding service block on the PDK.

* * * * *